United States Patent
Sheik et al.

(10) Patent No.: US 9,949,296 B2
(45) Date of Patent: Apr. 17, 2018

(54) RESOLVING CONFLICTING CONFIGURATION PARAMETERS BETWEEN CELL RECONFIGURATION AND CELL RESELECTION PROCEDURES

(71) Applicant: QUALCOMM Incorporated, San Diego, CA (US)

(72) Inventors: Ansah Ahmed Sheik, Hyderabad (IN); Liangchi Hsu, San Diego, CA (US); Vagish Gupta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 15/006,700

(22) Filed: Jan. 26, 2016

(65) Prior Publication Data

US 2016/0316404 A1  Oct. 27, 2016

Related U.S. Application Data

(60) Provisional application No. 62/151,859, filed on Apr. 23, 2015.

(51) Int. Cl.
| | | |
|---|---|---|
| H04W 4/00 | (2018.01) | |
| H04W 74/08 | (2009.01) | |
| H04W 48/20 | (2009.01) | |

(52) U.S. Cl.
CPC ....... H04W 74/0825 (2013.01); H04W 48/20 (2013.01)

(58) Field of Classification Search
CPC ............. H04W 48/20; H04W 74/0825; H04W 36/0066; H04W 36/0061
See application file for complete search history.

(56) References Cited

U.S. PATENT DOCUMENTS

| | | | |
|---|---|---|---|
| 2005/0070274 A1 | 3/2005 | Pedlar et al. | |
| 2005/0101299 A1* | 5/2005 | Farnsworth | H04W 4/12 455/412.1 |

(Continued)

FOREIGN PATENT DOCUMENTS

| | | |
|---|---|---|
| WO | WO-2014/181155 A1 | 11/2014 |
| WO | WO-2015/080887 A1 | 6/2015 |

OTHER PUBLICATIONS

International Search Report and Written Opinion—PCT/US2016/024187—ISA/EPO—dated Jun. 9, 2016. 13 Total Pages.

(Continued)

*Primary Examiner* — Minh-Trang Nguyen
(74) *Attorney, Agent, or Firm* — Arent Fox LLP

(57) ABSTRACT

Aspects of resolving conflicting configuration parameters during wireless communication include triggering reselection to a new cell from a current cell and determining that a user equipment (UE) is configured in a forward access channel (FACH) state and is waiting for a Layer 2 Acknowledgement (L2 ACK) message from a network entity when reselection to the new cell is triggered. Further, the aspects include performing a collision resolution procedure in response to the determination that the UE is configured in the FACH state and is waiting for the L2 ACK message. In some aspects, the collision resolution procedure establishes which one of a plurality of information elements (IEs) to choose for a reconfiguration procedure.

20 Claims, 5 Drawing Sheets

(56) References Cited

U.S. PATENT DOCUMENTS

| | | | |
|---|---|---|---|
| 2008/0188220 A1 | 8/2008 | Digirolamo et al. | |
| 2011/0263222 A1* | 10/2011 | Farnsworth | H04L 63/12 |
| | | | 455/410 |
| 2012/0275340 A1* | 11/2012 | McGann | H04W 24/02 |
| | | | 370/254 |
| 2014/0243039 A1* | 8/2014 | Schmidt | H04W 76/023 |
| | | | 455/552.1 |

OTHER PUBLICATIONS

Motorola: "Cell update during reconfiguration from CELL_FACH to CELL_PCH", 3GPP Draft; R2-041797-25331 R6CR2404-Cell-Update-DURINGRECOFIG-TO-PCH, 3rd Generation Partnership Project (3GPP), Mobile Competence Centre; 650, Route Des Lucioles ; F-06921 Sophia-Antipolis Cedex ; France, vol. RAN WG2, No.Prague, Czech Republic; Aug. 23, 2004 (Aug. 23, 2004), XP050126428.

Motorola: "Cell Update During Reconfiguration Procedure", 3GPP Draft; R2-051903, 3RD Generation Partnership Project (3GPP), Mobile Competence Centre; 650, Route Des Lucioles; F-06921 Sophia-Antipolis Cedex ; France, RAN WG2, London, UK; Aug. 24, 2005 (Aug. 24, 2005), XP050129056.

* cited by examiner

US 9,949,296 B2

RESOLVING CONFLICTING CONFIGURATION PARAMETERS BETWEEN CELL RECONFIGURATION AND CELL RESELECTION PROCEDURES

CLAIM OF PRIORITY UNDER 35 U.SC. § 119

The present Application for Patent claims priority to U.S. Provisional Application No. 62/151,859 entitled "RESOLVING CONFLICTING CONFIGURATION PARAMETERS BETWEEN CELL RECONFIGURATION AND CELL RESELECTION PROCEDURES" filed Apr. 23, 2015, which is assigned to the assignee hereof and hereby expressly incorporated by reference herein.

BACKGROUND

Aspects of the present disclosure relate generally to wireless communication systems, and particularly to resolving conflicting configuration parameters during wireless communication.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

A user equipment (UE) may be connected to a network through a current cell (e.g., a geographical area covered by a cellular telephone transceiver of a wireless network access point, such as a base station). Naturally, the UE may be required to change cells from the current cell due to any one or more of a number of reasons, including, but not limited to, cell load balancing, diminishing cell signal quality, physically moving out of range of the cell coverage area, etc. As a result, the network may signal to the UE to reconfigure to a new cell from the current cell. However, as part of the regular signaling procedure, the UE may also have a reselection procedure triggered, and as a result, there may be conflicting configuration parameters between the cell update and reconfiguration procedures. For example, the 3GPP Specification TS 25.331 does not specify which configuration parameters (e.g., information elements (IEs)) to configure if there are common configuration parameters which may cause the UE to become out of synchronization with the network.

Therefore, enhancements to resolving conflicting configuration parameters during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a present method relates to resolving conflicting configuration parameters during wireless communication. The described aspects include triggering reselection to a new cell from a current cell. The described aspects further include determining that a UE is configured in a forward access channel (FACH) state and is waiting for a Layer 2 Acknowledgement (L2 ACK) message from a network entity when reselection to the new cell is triggered. The described aspects further include performing a collision resolution procedure in response to the determination that the UE is configured in the FACH state and is waiting for the L2 ACK message, wherein the collision resolution procedure establishes which one of a plurality of information elements (IEs) to choose for a reconfiguration procedure.

In another aspect, a present computer-readable medium storing computer executable code relates to resolving conflicting configuration parameters during wireless communication. The described aspects include code for triggering reselection to a new cell from a current cell. The described aspects further include code for determining that a UE is configured in a FACH state and is waiting for a L2 ACK message from a network entity when reselection to the new cell is triggered. The described aspects further include code for performing a collision resolution procedure in response to the determination that the UE is configured in the FACH state and is waiting for the L2 ACK message, wherein the collision resolution procedure establishes which one of a plurality of IEs to choose for a reconfiguration procedure.

In a further aspect, a present apparatus relates to resolving conflicting configuration parameters during wireless communication. The described aspects include means for triggering reselection to a new cell from a current cell. The described aspects further include means for determining that a UE is configured in a FACH state and is waiting for a L2 ACK message from a network entity when reselection to the new cell is triggered. The described aspects further include means for performing a collision resolution procedure in response to the determination that the UE is configured in the FACH state and is waiting for the L2 ACK message, wherein the collision resolution procedure establishes which one of a plurality of IEs to choose for a reconfiguration procedure.

In another aspect, a present apparatus relates to resolving conflicting configuration parameters during wireless communication. The described aspects include a memory configured to store data, and one or more processors communicatively coupled with the memory, wherein the one or more processors and the memory are configured to trigger reselection to a new cell from a current cell. The described aspects further determine that a UE is configured in a FACH state and is waiting for a L2 ACK message from a network entity when reselection to the new cell is triggered. The described aspects further perform a collision resolution procedure in response to the determination that the UE is configured in the FACH state and is waiting for the L2 ACK message, wherein the collision resolution procedure establishes which one of a plurality of IEs to choose for a reconfiguration procedure.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

Figure 1:
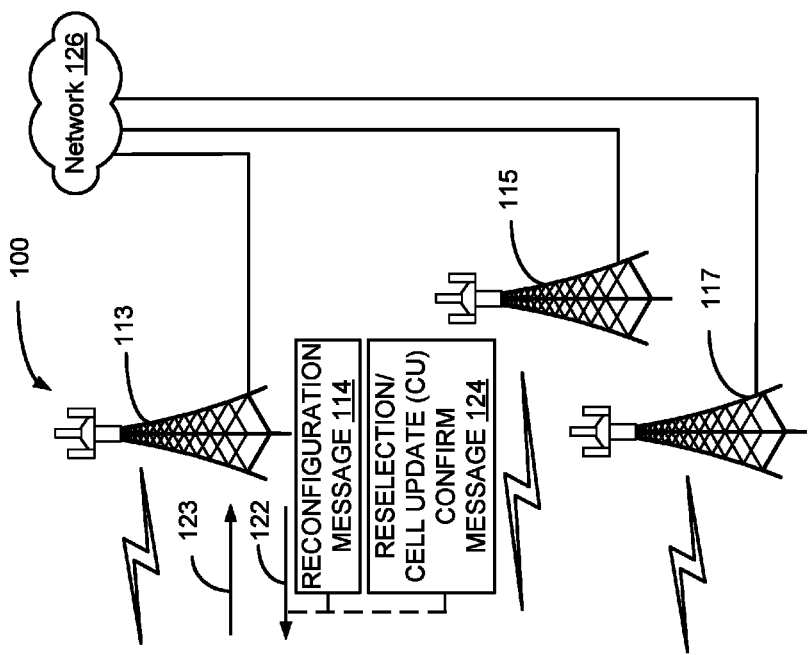
FIG. 1 is a schematic diagram of a communications network including a user equipment having an aspect of resolving conflicting configuration parameters.
Figure 1:
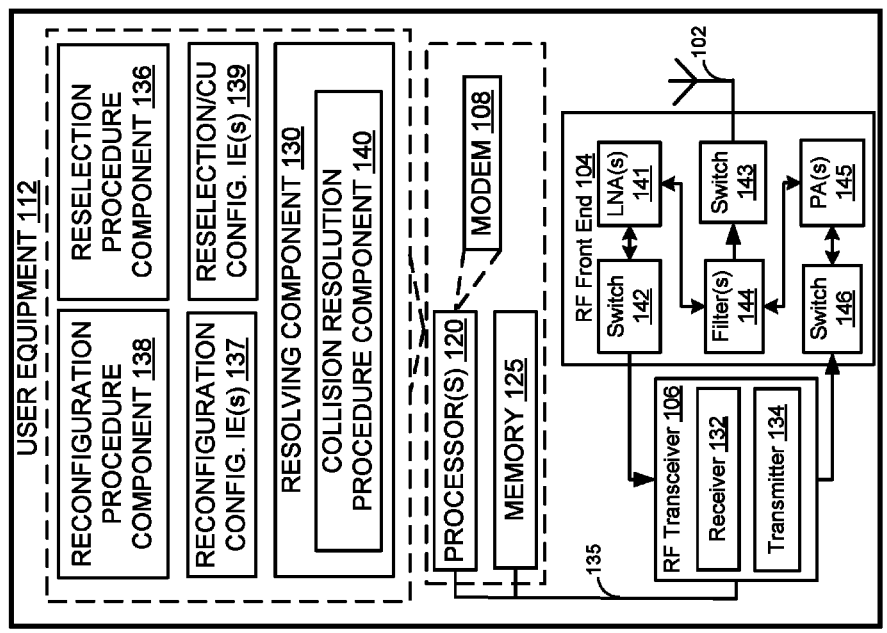

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "processor" as used herein may be hardware, firmware, and/or software, and may be divided into other processors.

The present disclosure provides for an enhanced or improved apparatus and/or procedure for resolving conflicting configuration parameters. In particular, the present aspects define the UE behavior for choosing configuration-related Information Elements (IEs) if cell reselection is triggered when reconfiguration procedure is pending. For example, when the UE is required to change cells from the current cell due to any of a number of conditions (e.g., cell load balancing, diminishing cell signal quality, physically moving out of range of the cell coverage area, etc.), a reselection procedure may be triggered by the UE. The reselection procedure leads to a cell update procedure being performed, resulting in the UE receiving a cell update confirm message including new configuration parameters. Concurrently, the UE may be in the middle of performing a reconfiguration procedure, e.g., where the UE is currently in a forward access channel (FACH) state and is waiting for a Layer 2 Acknowledgement (L2 ACK) message from the network entity (e.g., the L2 ACK message is to be transmitted by the network entity in response to receiving a reconfiguration complete message from the UE as part of the reconfiguration procedure). In prior solutions, however, the UE may become out-of-sync with the network after completing the reconfiguration procedure due to conflicting common information elements (IEs) in the cell update confirm message and the reconfiguration message. In other words, the network may be expecting the UE to communicate with one cell associated with one set of configuration parameters (e.g., IEs), while the UE may be using a different set of configuration parameters (e.g., IEs) associated with a different cell (or at least different values for IEs that are common to both cells). If the UE uses the incorrect IEs from either of the cell update confirm message and the reconfiguration message, after applying the reconfiguration message, this may cause the out-of-sync condition with the network, which can result in a radio link control (RLC) unrecoverable error and potential dropping of packet switched calls.

As such, the present methods and apparatus perform a collision resolution procedure in order to resolve conflicting configuration parameters (e.g., IEs) during wireless communication. Accordingly, in some aspects, the present methods and apparatus may provide an efficient solution, as compared to current solutions, for example, to enable the UE to properly determine the correct configuration parameters to use for completing the reconfiguration procedure in a number of scenarios.

Referring to FIG. 1, in one aspect, a wireless communication system 100 includes a user equipment (UE) 112 having relatively small amounts of bursty data for uplink transmission to a network 24, one or more processors 120, memory 125, and a resolving component 130 executable by processor 120 and memory 125 that can control reselection and reconfiguration procedures and resolve conflicts between IEs during a collision resolution procedure while UE 112 is in a forward access state (CELL_FACH state). For instance, UE 112 may be camped on a first cell serviced by network entity 113 while in a CELL_FACH state, when UE 112 receives a reconfiguration message from network entity 113. The reconfiguration message may configure resolving component 130 to access reconfiguration procedure component 138 in order to trigger a reconfiguration procedure. Network entities 113, 115, and/or 117 may be base station, radio network controller (RNC), or mobile management entity (MME) depending on the radio access technology (RAT) type (e.g., W-CDMA or LTE) and/or the configuration of the network.

In an aspect, UE 112 may be configured in a CELL_FACH state in a first cell serviced by network entity 113, and may receive a reconfiguration message 114 from network entity 113 on a downlink (DL) channel 122. For example, the reconfiguration message 101 may be received via antenna 102, radio frequency (RF) front end 104, and RF transceiver 106, which may forward the reconfiguration message 114 via one or more buses 135 to processor 120 and/or memory 125, and ultimately to Layer 3 (L3) entity, e.g., a radio resource control (RRC) protocol layer entity, in a protocol stack of UE 112. For instance, in an example, the reconfiguration message 114 may include configuration information, e.g., one or more configuration parameters in the form of one or more reconfiguration procedure configuration information elements (IEs) 137, that redirects UE 112 to a second cell (e.g., a new cell serviced by network entity 116). For instance, the second cell may be determined by reconfiguration procedure configuration IEs 137 that include frequency information and primary common pilot channel (CPICH) information. The reconfiguration message 114 may also include one or more reconfiguration procedure configuration IEs 137 to configure UE 112 to a cell physical channel (CELL_PCH) state. The reconfiguration message 114 may also include one or more reconfiguration procedure configuration IEs 137 such as, but not limited to, radio network temporary identifiers (RNTIs). Resolving component 130 and/or reconfiguration procedure component 138 may be configured to begin a reconfiguration procedure upon receiving the reconfiguration message 114 from the network entity 113.

In an aspect, resolving component 130 and/or reconfiguration procedure component 138 may cause UE 112, such as via the L3 entity, e.g., RRC protocol layer entity, to transmit a reconfiguration complete message to a Layer 2 (L2) entity. In such aspects, the Layer 3 entity and Layer 2 entity may respectively correspond to each layer of a communication protocol, such as but not limited to a Layer 1 (L1) or Physical (PHY) layer encoder/decoder, a Layer 2 (L2) or Medium Access Control (MAC) layer encoder/decoder, and a Layer 3 (L3) or RRC layer encoder/decoder. For instance, for processing a received communication, each respective decoder entity passes decoded or processed data (e.g., communication information) to a next decoder entity according to a given protocol procedure and format. In such aspects, Layer 1 may pass decoded or processed communication information to Layer 2 for subsequent processing/decoding. The L2 entity may in turn transmit the reconfiguration complete message to network entity 113 of the first cell via UL channel 123. UE 112 may then wait for an L2 Acknowledgment (L2 ACK) message (e.g., which may or may have triggered the CELL_PCH state transition) from the network entity 113 in response to transmitting the reconfiguration complete message. However, while UE 112 waits for the L2 ACK message, L1 entity may configure resolving component 130 and/or reselection procedure component 136 to trigger a reselection procedure. For instance, in an example, the L1 entity may transmit a reselection indication, identifying a new cell such as a second cell serviced by network entity 115 or a different third cell serviced by network entity 117, to RRC entity to trigger the reselection procedure. Thereafter, UE 112 may receive a cell update confirm message 124 including reselection/cell update configuration IEs 139 corresponding to second cell serviced by network entity 115 or to third cell serviced by network entity 117. In other words, reselection/cell update configuration IEs 139 may be the same as, or may be different from, reconfiguration procedure configuration IEs 137.

According to the present aspects, resolving component 130 and/or collision resolution procedure component 140 may be configured to perform a collision resolution procedure in order to resolve any conflicts between IEs that may potentially exist, e.g., between reselection/cell update configuration IEs 139 in the cell update confirm message 124 and reconfiguration procedure configuration IEs 137 in the reconfiguration message 114. In the present aspects, depending on the cell identified in the reselection indication and the subsequent cell update confirm message 124, which may not necessarily be the same as the cell that was identified by reconfiguration message 114, the IEs chosen by the collision resolution procedure may differ. As such, a number of scenarios exist for the collision resolution procedure to take into consideration.

In an aspect, the reselection indication message may include information to reselect UE 112 to the second cell (e.g., a new cell serviced by network entity 115). For instance, in an example of a first scenario, resolving component 130 and/or collision resolution procedure component 140 may pend the reconfiguration message as the reselection procedure is triggered. Then, UE 112 RRC may transmit a cell update message as part of the reselection procedure to network entity 113. The cell update message may include reconfiguration status indicator (RSI) set to TRUE to indicate that a reconfiguration procedure is ongoing. Moreover, the cell update message may include information indicating reselection to the second cell (e.g., network entity 115). Network entity 113 may transmit a cell update confirm message in response to receiving the cell update message from UE 112. For instance, in an example, the cell update confirm message 124 may include reselection/cell update configuration IEs 139 that are different from the reconfiguration procedure configuration IEs 137 included in the initial reconfiguration message 114 received previously. For example, the IEs included in the cell update confirm message 124 may correspond to a second set of RTNIs different from the first set of RNTIs included in the reconfiguration message 114. The L2 ACK message may then be transmitted by network entity 113 after the transmission of the cell update confirm message 124. In an instance, the L2 ACK message may be transmitted to the L2 entity, which in turn may forward the L2 ACK message to the RRC entity.

As such, there are conflicting IEs between the reselection procedure and the reconfiguration procedure. For instance, in an example, the collision resolution procedure executed by collision resolution procedure component 140 or resolving component 130 may include applying the reselection/cell update configuration IEs 139 included in the cell update confirm message 124 for the reconfiguration procedure to the second cell (e.g., network entity 115). Thus, UE 112 may act on pended reconfiguration message and move to the second cell but apply the second set of RNTIs (e.g., reselection/cell update configuration IEs 139) that were included in the cell update confirm message 124 instead of the first set of RNTIs (e.g., reconfiguration procedure configuration IEs 137) that were included in the reconfiguration message 114. Optionally, after completing the reconfiguration procedure, UE 112, resolving component 130, and/or reselection procedure component 136 may transmit an additional cell update message including the second set of RNTIs (e.g., reselection/cell update configuration IEs 139) to the network entity for the second cell (e.g., network entity 115) with a RSI of the additional cell update message being set to FALSE.

In a further aspect, the reselection indication message may include information to reselect or redirect UE 112 to a third cell (e.g., a new cell serviced by network entity 117). For instance, in an example of a second scenario, resolving component 130 and/or collision resolution procedure component 140 may pend the reconfiguration message as the reselection procedure is triggered. Then, RRC entity may transmit a cell update message as part of the reselection procedure to network entity 113. The cell update message may include RSI set to TRUE to indicate that a reconfiguration procedure is ongoing. Moreover, the cell update message may include information indicating reselection or redirection to the third cell (e.g., network entity 117).

Network entity 113 may transmit a cell update confirm message 124 in response to receiving the cell update message from UE 112. For instance, in an example, the cell update confirm message 124 may include IEs that are different from the IEs included in the initial reconfiguration message received previously. For example, the IEs included in the cell update confirm message 124 may correspond to a second set of RTNIs (e.g., reselection/cell update configuration IEs 139) different from the first set of RNTIs (e.g., reconfiguration procedure configuration IEs 137) included in the reconfiguration message 114. The L2 ACK message may then be transmitted by network entity 113 after the transmission of the cell update confirm message 124. In an instance, the L2 ACK message may be transmitted to the L2 entity, which in turn may forward the L2 ACK message to the RRC entity.

As such, there are conflicting IEs between the reselection procedure and the reconfiguration procedure. For instance, in an example, the collision resolution procedure executed by collision resolution procedure component 140 or resolving component 130 may include applying the IEs included in the reconfiguration message for the reconfiguration procedure to the second cell (e.g., network entity 115). Thus, UE 112 may act on pended reconfiguration message and move to the second cell but apply the first set of RNTIs (e.g., reconfiguration procedure configuration IEs 137) that were included in the reconfiguration message 114 instead of the second set of RNTIs (e.g., reselection/cell update configuration IEs 139) that were included in the cell update confirm message 124. Optionally, UE 112, resolving component 130, and/or reselection procedure component 136 may transmit an additional cell update message including the first set of RNTIs (e.g., reconfiguration procedure configuration IEs 137) to the network entity 115 for the third cell with a RSI of the additional cell update message being set to FALSE.

In another aspect, the reselection indication message may again include information to reselect or redirect UE 112 to the third cell (e.g., a new cell serviced by network entity 117). For instance, in an example of a third scenario, resolving component 130 and/or collision resolution procedure component 140 may pend the reconfiguration message as the reselection procedure is triggered. Then, RRC entity may transmit a cell update message as part of the reselection procedure to network entity 113. The cell update message may include RSI set to TRUE to indicate that a reconfiguration procedure is ongoing. Moreover, the cell update message may include information indicating reselection or redirection to the third cell (e.g., network entity 117).

Network entity 113 may transmit a cell update confirm message in response to receiving the cell update message from UE 112. For instance, in an example, the cell update confirm message may include IEs that are different from the IEs included in the initial reconfiguration message received previously. For example, the IEs included in the cell update confirm message may correspond to a second set of RTNIs different from the first set of RNTIs included in the reconfiguration message. The L2 ACK message may then be transmitted by network entity 113 after the transmission of the cell update confirm message. In an instance, the L2 ACK message may be transmitted to the L2 entity, which in turn may forward the L2 ACK message to the RRC entity.

As such, there are conflicting IEs between the reselection procedure and the reconfiguration procedure. For instance, in an example, the collision resolution procedure may determine whether a cell quality of the third cell (e.g., network entity 117) is greater than a cell quality of the second cell (e.g., network entity 115). As a result of the determination, the collision resolution procedure may include either applying the RNTIs included in the cell update confirm message for the reconfiguration procedure to the third cell (e.g., network entity 117) when the cell quality of the third cell (e.g., network entity 117) is greater than the cell quality of the second cell (e.g., network entity 115), or applying RNTIs included in the reconfiguration message for the reconfiguration procedure to the second cell (e.g., network entity 115) when the cell quality of the third cell (e.g., network entity 117) is not greater than the cell quality of the second cell (e.g., network entity 115). For example, if resolving component 130 and/or collision resolution procedure component 140 determines that the cell quality of the third cell (e.g., network entity 117) is greater than the cell quality of the second cell (e.g., network entity 115), then resolving component 130 and/or reconfiguration procedure component 138 may complete pended reconfiguration message to move to the third cell and use the RNTIs included in the cell update confirm message.

Additionally, the collision resolution procedure executed by collision resolution procedure component 140 or resolving component 130 may include transmitting an additional cell update message including either the RNTIs included in the reconfiguration message 114 or the RNTIs included in the cell update confirm message 124 to the network entity based on the determination whether the cell quality of the third cell (e.g., network entity 117) is greater than the cell quality of the second cell (e.g., network entity 115) with a RSI of the additional cell update message is set to FALSE.

Moreover, in an aspect, UE 112 may include RF front end 104 and transceiver 106 for receiving and transmitting radio transmissions, for example, wireless communication signals exchanged with one or more of network entity 113, or network entity 115, or network entity 117. In an aspect, transceiver 106 may include at least one transmitter 132 and at least one receiver 134. Further, for example, transceiver 106 may receive a signal that includes a pilot signal (e.g., common pilot channel (CPICH)) from each network entity. The transceiver 106 may measure the received pilot signal in order to determine signal quality and for providing feedback to the serving network entity 14, e.g., to initiate reselection procedure and/or reconfiguration procedure. For example, transceiver 106 may communicate with modem 108 to transmit messages generated by, or receive messages received for, one or more of reconfiguration procedure component 138, or reselection procedure component 136, or resolving component 130, such as reconfiguration message 114 and cell update confirm message 124, among others.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 120.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit path or a receive path using a specified filter 144, LNA, 141, and/or PA 145, based on a configuration as specified by transceiver 106 and/or processor 120.

Transceiver 106 may be configured to transmit and receive wireless signals through antenna 102 via RF front end 104. In an aspect, transceiver 106 may be tuned to operate at specified frequencies such that UE 112 can communicate with, for example, network entity 113, network entity 115, or network entity 117. In an aspect, for example, modem 108 can configure transceiver 106 to operate at a specified frequency and power level based on the UE configuration of the UE 12 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 112 (e.g., RF front end 104, transceiver 106) to enable transmission and/or reception of signals from the network based on a specified modem configuration. In an aspect, the modem configuration can be based on the mode of the modem and the frequency band in use. In another aspect, the modem configuration can be based on UE configuration information, e.g., reconfiguration procedure configuration IEs 137 and reselection/cell update configuration IEs 139, associated with UE 112 as provided by the network during a cell selection and/or cell reselection procedure, and/or a reconfiguration procedure.

UE 112 may further include memory 125, such as for storing data used herein and/or local versions of applications or one or more of reconfiguration procedure component 138, or reselection procedure component 136, or resolving component 130, and/or one or more of their respective subcomponents being executed by processor 120. Memory 125 can include any type of computer-readable medium usable by a computer or processor 120, such as random access memory (RAM), read only memory (ROM), tapes, magnetic discs, optical discs, volatile memory, non-volatile memory, and any combination thereof. In an aspect, for example, memory 125 may be a computer-readable storage medium that stores one or more computer-executable codes defining one or more of reconfiguration procedure component 138, or reselection procedure component 136, or resolving component 130, and/or one or more of their respective subcomponents, and/or data associated therewith, when UE 112 is operating processor 120 to execute one or more of reconfiguration procedure component 138, or reselection procedure component 136, or resolving component 130, and/or one or more of their respective subcomponents. In another aspect, for example, memory 125 may be a non-transitory computer-readable storage medium.

Figure 2:
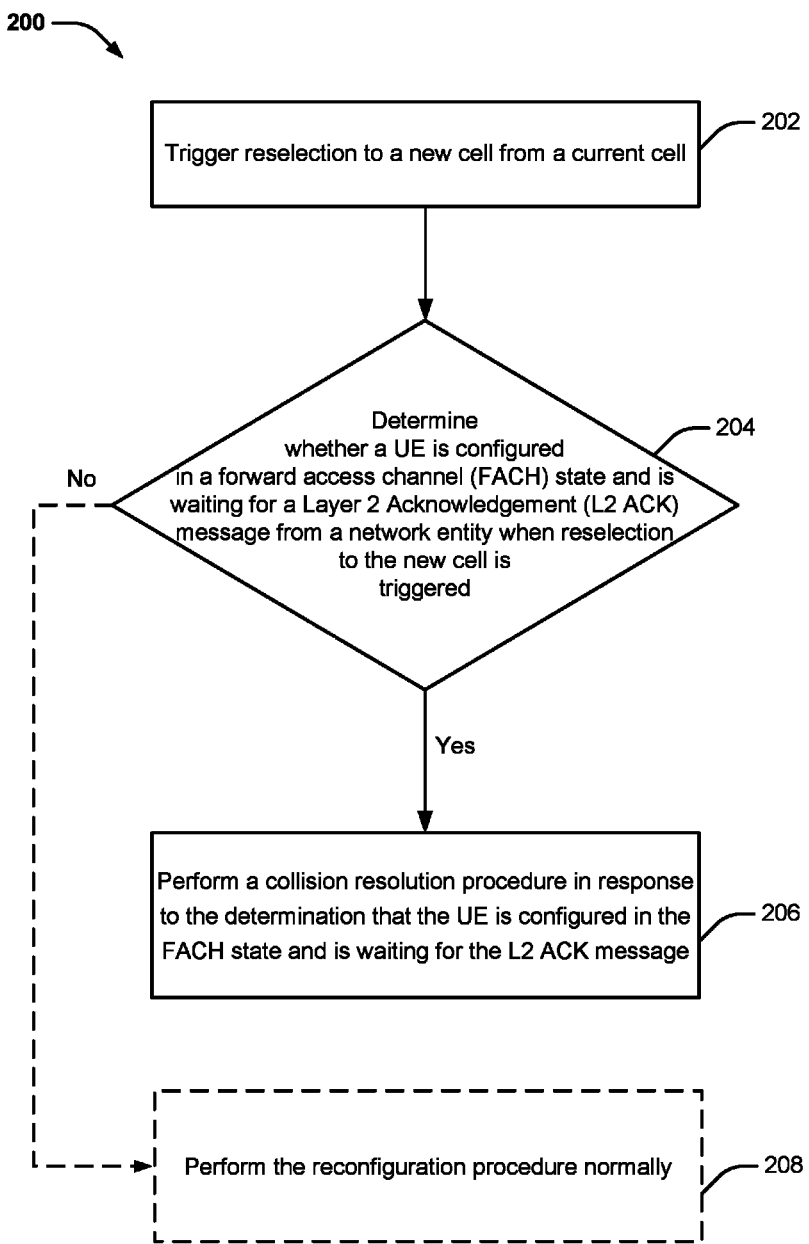
FIG. 2 is a flowchart of an aspect of a method for resolving conflicting configuration parameters, which may be executed by the user equipment of FIG. 1.

Referring to FIG. 2, a UE such as UE 112 (FIG. 1) may include one or more processors 120 and/or memory 125 operable to perform an aspect of a method 200 for resolving conflicting configuration parameters during wireless communication. In an aspect, for example, method 200 may be performed by execution of one or any combination of reconfiguration procedure component 138, or reselection procedure component 136, or resolving component 130. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 202, the method 200 may include triggering reselection to a new cell from a current cell. For example, in an aspect, UE 112, resolving component 130, and/or reselection procedure component 136 may trigger reselection to a new cell (either, e.g., a cell serviced by network entity 115 or a cell serviced by network entity 117) from a current cell (e.g., network entity 113). For instance, in an example, the reselection may be triggered in response to receiving a reselection indication message at the RRC entity of UE 112 from L1 entity.

In an aspect, at block 204, the method 200 may include determining whether a UE is configured in a forward access channel (FACH) state and is waiting for a Layer 2 Acknowledgement (L2 ACK) message from a network entity when reselection to the new cell is triggered. For example, in an aspect, UE 112, resolving component 130, and/or reconfiguration procedure component 138 may determine whether UE 112 is configured in a FACH state and is waiting for a L2 ACK message from a network entity 113 when reselection to the new cell (either, e.g., the cell serviced by network entity 115 or the cell serviced by network entity 117) is triggered (e.g., which may or may have triggered the CELL_PCH state transition). For instance, in an example, UE 112 and/or resolving component 130 may be configured in a FACH state when reconfiguration procedure is triggered by reconfiguration procedure component 138 in response to receiving a reconfiguration message from the network entity 113.

In an aspect, at block 206, the method 200 may include performing a collision resolution procedure in response to the determination that the UE is configured in the FACH state and is waiting for the L2 ACK message. For example, in an aspect, UE 112, resolving component 130, and/or collision resolution procedure component 140 may perform a collision resolution procedure in response to the determination that the UE 112 is configured in the FACH state and is waiting for the L2 ACK message. For instance, in an example, the collision resolution procedure establishes which one of a plurality of IEs to choose for a reconfiguration procedure.

For instance, in a first scenario, performing the collision resolution procedure may include establishing that the new cell (in this scenario, e.g., the cell serviced by network entity 115) is included in a reconfiguration message received from network entity 113 prior to triggering the reselection. Further, the collision resolution procedure may include applying new cell IEs included in a cell update confirm message for the reconfiguration procedure to the new cell (e.g., network entity 115). The cell update confirm message was previously received from the network entity 113 in response to triggering the reselection. Optionally, UE 112, resolving component 130, and/or reselection procedure component 136 may transmit an additional cell update message including the new cell IEs to the network entity (e.g., network entity 115) for the new cell with a reconfiguration status indicator (RSI) of the additional cell update message is set to FALSE.

For instance, in a second scenario, performing the collision resolution procedure may include establishing that the new cell (in this scenario, e.g., the cell serviced by network entity 117) is not included in a reconfiguration message received from the network entity 113 prior to triggering the reselection. In certain instances, for example, the reconfiguration message includes a third cell (in this scenario, e.g., the cell serviced by network entity 115) different from the new cell (in this scenario, e.g., the cell serviced by network entity 117) and the current cell (e.g., network entity 113). Further, the collision resolution procedure may include applying third cell IEs included in the reconfiguration message for the reconfiguration procedure to the third cell (e.g., the cell serviced by network entity 117). Optionally, UE 112, resolving component 130, and/or reselection procedure component 136 may transmit an additional cell update message including the third cell IEs to the network entity 115 for the third cell with a RSI of the additional cell update message is set to FALSE.

For instance, in a third scenario, performing the collision resolution procedure may include establishing that the new cell (in this scenario, e.g., the cell serviced by network entity 117) is not included in a reconfiguration message received from the network entity 113 prior to triggering the reselection. In certain instances, for example, the reconfiguration message includes a third cell (e.g., the cell serviced by network entity 115) different from the new cell (e.g., the cell serviced by network entity 117) and the current cell (e.g., the cell serviced by network entity 113). Further, the collision resolution procedure may include determining whether a cell quality of the new cell (e.g., the cell serviced by network entity 117) is greater than a cell quality of the third cell (e.g., the cell serviced by network entity 115).

As a result of the determination, the collision resolution procedure may include either applying new cell IEs included in the cell update confirm message for the reconfiguration procedure to the new cell (e.g., the cell serviced by network entity 117) when the new cell quality of the new cell (e.g., the cell serviced by network entity 117) is greater than the cell quality of the third cell (e.g., the cell serviced by network entity 115), or applying third cell IEs included in the reconfiguration message for the reconfiguration procedure to the third cell (e.g., the cell serviced by network entity 115) when the cell quality of the new cell (e.g., the cell serviced by network entity 117) is not greater than the cell quality of the third cell (e.g., the cell serviced by network entity 115). Additionally, the collision resolution procedure may include transmitting an additional cell update message including either the new cell IEs or the third cell IEs to the network entity based on the determination whether the cell quality of the new cell (e.g., the cell serviced by network entity 117) is greater than the cell quality of the third cell (e.g., the cell serviced by network entity 115) with a RSI of the additional cell update message is set to FALSE.

In an aspect, at block 208, method 200 may optionally include performing the reconfiguration procedure normally with performing the collision resolution procedure. For example, in an aspect, UE 112, resolving component 130, and/or reconfiguration procedure component 138 may perform the reconfiguration procedure normally with performing the collision resolution procedure based on the determination that the UE 112 is not configured in the FACH state and/or is not waiting for the L2 ACK message when reselection is triggered.

Figure 3:
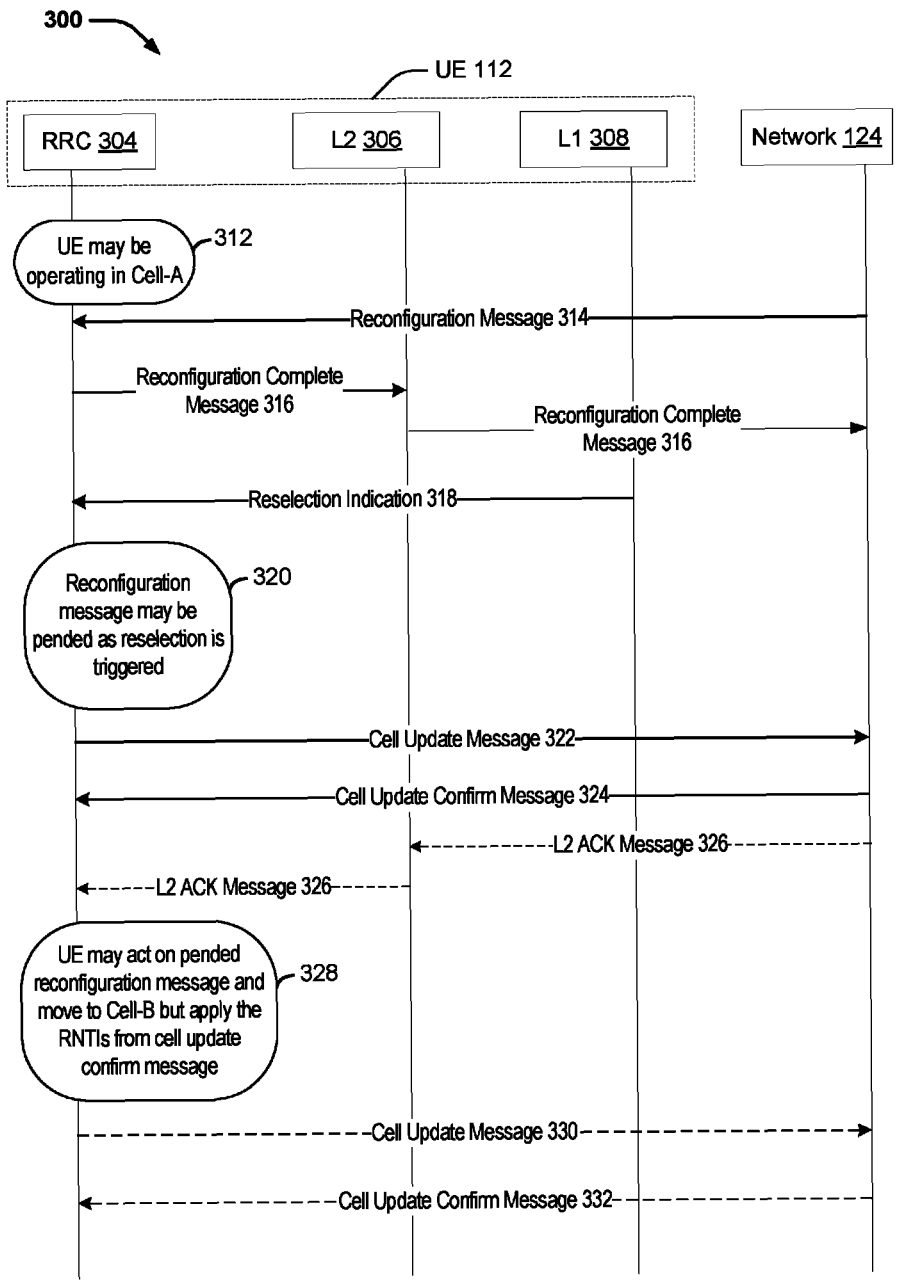
FIG. 3 is a diagram illustrating an aspect for resolving conflicting configuration parameters in accordance with various aspects of the present disclosure.
Figure 4:
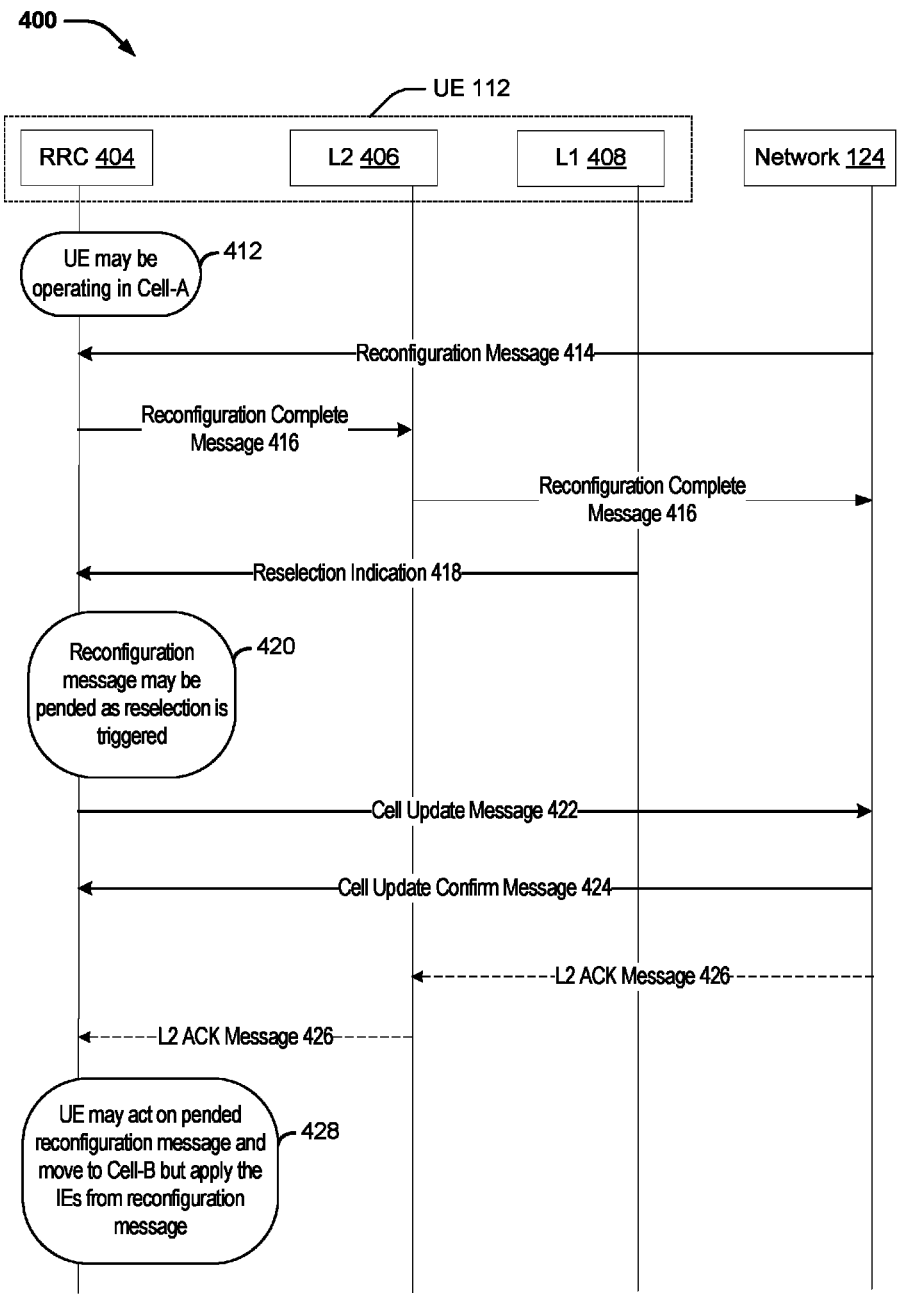
FIG. 4 is a diagram illustrating an aspect for resolving conflicting configuration parameters in accordance with various aspects of the present disclosure.
Figure 5:
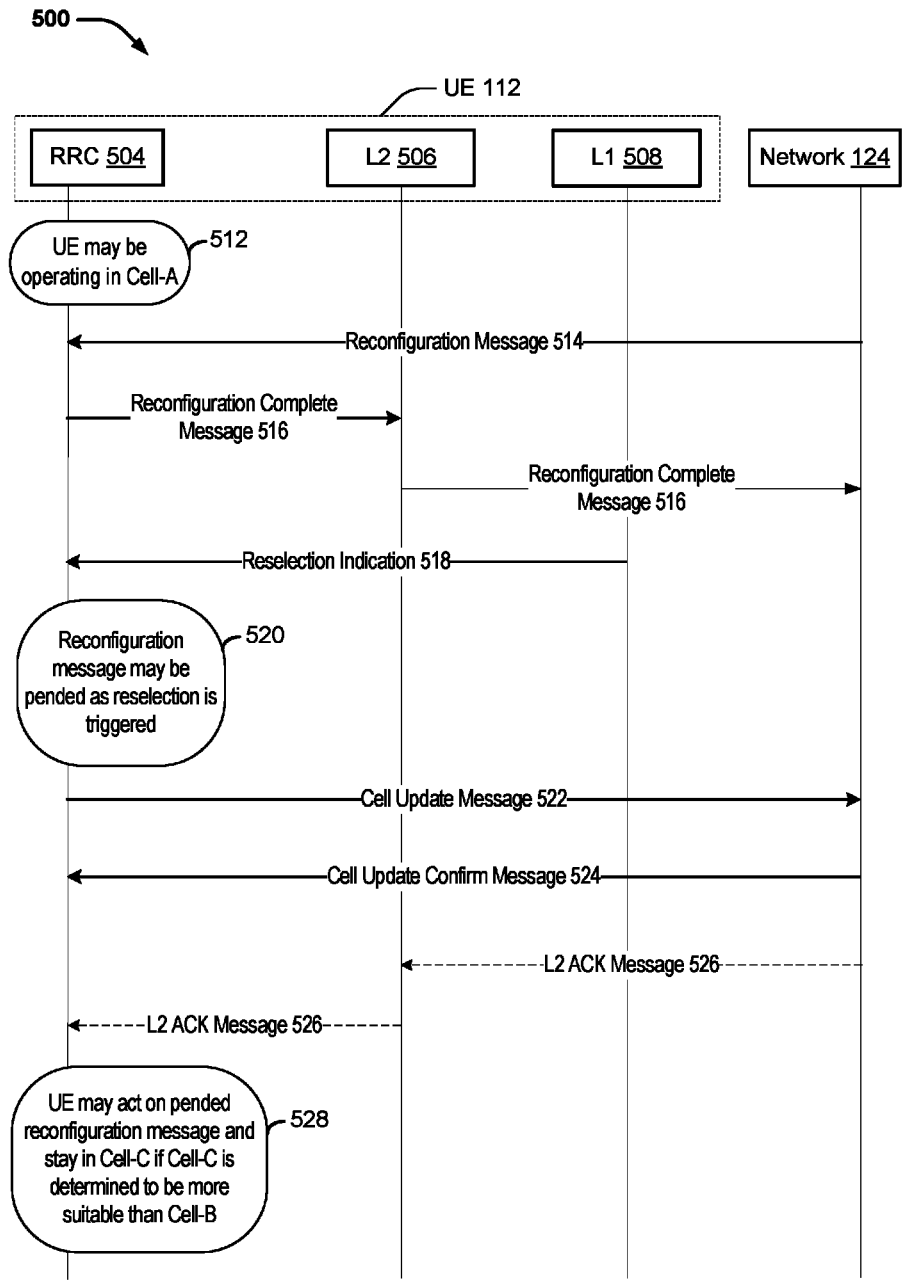
FIG. 5 is a diagram illustrating an aspect for resolving conflicting configuration parameters in accordance with various aspects of the present disclosure.

Referring to FIGS. 3-5, in operation, signaling charts 300, 400, and 500, respectively illustrate signaling for resolving conflicting configuration parameters during wireless communication between a UE (e.g., UE 112, FIG. 1) and a network (e.g., network 126, FIG. 1). In some aspects, the signaling charts illustrate the signaling between the RRC layer/entity, Layer 2 (L2), and Layer 1 (L1) corresponding to the UE. The UE may be located within a wireless communication system, such as wireless communication system 100 (FIG. 1). The UE may correspond to a UE, such as UE 112 (FIG. 1), and may include one or more processor(s), such as processor(s) 120, and/or memory 125 (FIG. 1) configured to execute resolving component 130.

Specifically, signaling charts 300, 400, and 500 illustrate targeted selection of conflicting IEs by UE 112 from one or both of reconfiguration message 114 (FIG. 1) or reselection/cell update confirm message 124 (FIG. 1) based on UE's 112 target state/cell and/or a previously received message. By selectively identifying colliding or conflicting IEs based on the UE's 112 target state/cell and/or a previously received message, UE 112 may rely on more accurate information (e.g., accurately identify conflicting IEs).

For example, signaling chart 300 illustrates a scenario where UE 112 was reconfigured in a previous cell, yet nonetheless reselects to a new cell that was included in the reconfiguration message 114 (FIG. 1). Further, for instance, signaling chart 400 illustrates a scenario where UE 112 was reconfigured in a previous cell, yet nonetheless reselects to another new cell that was not included in the reconfiguration message 114 (FIG. 1). Additionally, for example, signaling chart 500 illustrates a scenario where UE 112 was reconfigured in a previous cell, yet nonetheless reselects to another new cell associated with the same or similar RNC and new RNC redirection information is included in the reconfiguration message 114 (FIG. 1). As such, the example scenarios illustrate instances where reconfiguration message 114 (FIG. 1) and reselection/cell update confirm message 124 (FIG. 1) are colliding/conflicting.

Additionally, signaling charts 300, 400, and 500 provide for resolving colliding/conflicting (re)configuration parameters between the two messages. For example, with respect to signaling chart 300, UE 112 may select one or more RNTIs from reselection/cell update confirm message 124 (FIG. 1) as UE 112 may remain in Cell-B following processing of reconfiguration message 114 (FIG. 1) as reselection/cell update confirm message 124 (FIG. 1) may be the last message from network 126 providing the one or more RNTIs for Cell-B. In some aspects, UE 112 may perform a cell update with RSI set to zero and trigger cell reselection to ensure proper synchronization between UE 112 and network 126 (e.g., with respect to one or more RNTIs and other conflicting parameters). Further, it should be understood that the signaling charts are not limited to CRNTI/URNTI IEs and may apply to all common IEs that may be configured in reselection/cell update confirm message 124 (FIG. 1) when reconfiguration message 114 (FIG. 1) is pending (e.g., network information, HRNTI & ERNTI).

While, for purposes of simplicity of explanation, the steps herein are shown and described as a series of acts, it is to be understood and appreciated that the steps are not limited by the order of acts, as some acts may, in accordance with one or more aspects, occur in different orders and/or concurrently with other acts from that shown and described herein. For example, it is to be appreciated that the steps could alternatively be represented as a series of interrelated states or events, such as in a state diagram. Moreover, not all illustrated acts may be required to implement a step in accordance with one or more features described herein.

Referring to FIG. 3, signaling chart 300, in an aspect, at 312, UE 112, at RRC entity 304, may be operating within coverage of Cell-A in a CELL_FACH state. At 314, RRC entity 304 may receive a reconfiguration message from network 310. For example, the reconfiguration message may include information that redirects UE 112 to a second cell, Cell-B (e.g., a new cell serviced by another network entity). The reconfiguration message may also include information to configure UE 112 to a CELL_PCH state, and a first set of RNTIs corresponding to Cell-B. At 316, RRC entity 304 may transmit a reconfiguration complete message to L2 entity 306, which in turn may forward the reconfiguration complete message to network 126. At 318, L1 entity 308 may transmit a reselection indication 318 to RRC entity 304 to trigger a reselection procedure to Cell-B.

As such, at 320, the reconfiguration message may be pended as the reselection procedure is triggered. As part of the reselection procedure, at 322, RRC entity 304 may transmit a cell update message to network 126 indicating a cell reselection to Cell-B and may include RSI set to TRUE to indicate that a reconfiguration procedure is ongoing. In response, at 324, network 126 may transmit a cell update confirm message include a second set of RNTIs to RRC entity 304. However, in an aspect, the second set of RNTIs may differ from the first set of RNTIs received as part of the reconfiguration message at 314. At 326, network 310 may optionally transmit the L2 ACK message after the transmission of the cell update confirm message. The L2 ACK message may be transmitted to the L2 entity 306, which in turn may forward the L2 ACK message to the RRC entity 304. In turn, at 328, UE 112 may act on the pended reconfiguration message and move (e.g., reselect) to Cell-B, but apply the RNTIs provided in the cell update confirm message.

In some optional aspects, after completing the reconfiguration procedure, at 330, RRC entity 304 may transmit a cell update message including the RSI set to FALSE and with the RNTIs from the previous cell update confirm message (received at 324) to network 126. At 332, network 126 may transmit a cell update confirm to RRC entity 304 with a new set of RNTIs.

Referring to FIG. 4, signaling chart 400, in an aspect, UE 112, at RRC entity 404, may be operating within coverage of Cell-A in a CELL_FACH state. Signaling chart 400 illustrates an aspect where UE 112 may select one or more RNTIs from reconfiguration message 114 (FIG. 1) as UE 112 may redirect to Cell-C following processing of reconfiguration message 114 (FIG. 1) and reconfiguration message 114 (FIG. 1) may be the last message from network 126.

At 414, RRC entity 404 may receive a reconfiguration message from network 126. For example, the reconfiguration message may include information that redirects UE 402 to a second cell, Cell-B (e.g., a new cell serviced by another network entity). The reconfiguration message may also include information to configure UE 112 to a CELL_PCH state, and a first set of RNTIs corresponding to Cell-B. At 416, RRC entity 404 may transmit a reconfiguration complete message to L2 entity 406, which in turn may forward the reconfiguration complete message to network 410. At 418, L1 entity 408 may transmit a reselection indication 418 to RRC entity 404 to trigger a reselection procedure to Cell-C.

As such, at 420, the reconfiguration message may be pended as the reselection procedure is triggered. As part of the reselection procedure, at 422, RRC entity 404 may transmit a cell update message to network 126 indicating a cell reselection to Cell-C and may include RSI set to TRUE to indicate that a reconfiguration procedure is ongoing. In response, at 424, network 126 may transmit a cell update confirm message include a second set of RNTIs to RRC entity 404. However, in an aspect, the second set of RNTIs may differ from the first set of RNTIs received as part of the reconfiguration message at 414. At 426, network 126 may optionally transmit the L2 ACK message after the transmission of the cell update confirm message. The L2 ACK message may be transmitted to the L2 entity 406, which in turn may forward the L2 ACK message to the RRC entity 404. In turn, at 428, UE 112 may act on the pended reconfiguration message and move (e.g., reselect) to Cell-B, but apply the RNTIs provided in the reconfiguration message.

Referring to FIG. 5, signaling chart 500, in an aspect, UE 502, at RRC entity 504, may be operating within coverage of Cell-A in a CELL_FACH state. Signaling chart 500 illustrates an aspect where UE 112 may ignore or disregard the redirection information within reconfiguration message 114 (FIG. 1) and trigger a cell update after applying the reconfiguration as Cell-C of RNC1 (e.g., identified as the better cell compared to Cell-B of RNC2), which may result in avoiding further reselection. Of course, in some aspects, redirection information from reconfiguration message 114 (FIG. 1) may be executed or acted upon if Cell-B of RNC2 is better than Cell-C of RNC1 or the redirected cell belongs to or is associated with a different frequency.

At 514, RRC entity 504 may receive a reconfiguration message from network 126. For example, the reconfiguration message may include information that redirects UE 112 to a second cell, Cell-B (e.g., a new cell serviced by another network entity). The reconfiguration message may also include information to configure UE 112 to a CELL_PCH state, and a first set of RNTIs corresponding to Cell-B. At 516, RRC entity 504 may transmit a reconfiguration complete message to L2 entity 506, which in turn may forward the reconfiguration complete message to network 126. At 518, L1 entity 508 may transmit a reselection indication 518 to RRC entity 504 to trigger a reselection procedure to Cell-C.

As such, at 520, the reconfiguration message may be pended as the reselection procedure is triggered. As part of the reselection procedure, at 522, RRC entity 504 may transmit a cell update message to network 126 indicating a cell reselection to Cell-C and may include RSI set to TRUE to indicate that a reconfiguration procedure is ongoing. In response, at 524, network 126 may transmit a cell update confirm message include a second set of RNTIs to RRC entity 504. However, in an aspect, the second set of RNTIs may differ from the first set of RNTIs received as part of the reconfiguration message at 514. At 526, network 126 may optionally transmit the L2 ACK message after the transmission of the cell update confirm message. The L2 ACK message may be transmitted to the L2 entity 506, which in turn may forward the L2 ACK message to the RRC entity 504. In turn, at 528, UE 502 may act on the pended reconfiguration message and move (e.g., reselect) to Cell-B, but ignore the redirection information.

As a result, UE 112 may determine whether a cell quality of the Cell-B is greater than a cell quality of the Cell-C. In certain aspects, UE 112 may apply the RNTIs included in a cell update confirm message for the reconfiguration procedure to Cell-B when the cell quality of Cell-B is greater than the cell quality of Cell-C. In other aspects, UE 112 may apply the RNTIs included in the reconfiguration message for the reconfiguration procedure to Cell-C when the cell quality of the Cell-B is not greater than the cell quality of Cell-C. Additionally, RRC entity 504 may transmit an additional cell update message including either the RNTIs corresponding to Cell-B or Cell-C to network 126 based on the determination whether the cell quality of Cell-B is greater than the cell quality of Cell-C. The RSI of the additional cell update message is set to FALSE.

As used in this application, the terms "component," "function," "process," "system" and the like are intended to include a computer-related entity, such as but not limited to hardware, firmware, a combination of hardware and software, software, or software in execution. For example, a component may be, but is not limited to being, a specially programmed processor module, stored logic or instructions or code executable as a process running on a processor, a processor, an object, stored logic or instructions or code defining an executable, stored logic or instructions or code defining a thread of execution, an application or program, and/or a computer. By way of illustration, both an application running on a computing device and the computing device can be a component. One or more components can reside within a component and a component may be localized on one computer and/or distributed between two or more computers. In addition, these components can execute from various computer readable media having various data structures stored thereon. The component may communicate by way of communicatively coupled local and/or remote components such as in accordance with a signal having one or more data packets, such as data from one component interacting with another component in a local system, distributed system, and/or across a network such as the Internet with other systems, such as by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Several aspects of improved measurement event reporting message associated with a tune away have been presented with reference to a W-CDMA system. As those skilled in the art will readily appreciate, various aspects described throughout this disclosure may be extended to other telecommunication systems, network architectures and communication standards.

By way of example, various aspects described herein related to RACH preamble transmission may be extended to other UMTS and/or LTE and/or other systems where UE has bursty data to transmit which is not suitable for establishing a dedicated channel (e.g., during a forward access channel (CELL_FACH) state)). For example, such UMTS systems may include TD-SCDMA, High Speed Downlink Packet Access (HSDPA), High Speed Uplink Packet Access (HSUPA), High Speed Packet Access Plus (HSPA+) and TD-CDMA. Also, such LTE and/or other systems may include Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method of resolving conflicting configuration parameters during wireless communication, comprising:
    triggering reselection to a new cell from a current cell;
    determining that a user equipment (UE) is configured in a forward access channel (FACH) state and is waiting for a Layer 2 Acknowledgement (L2 ACK) message from a network entity when reselection to the new cell is triggered; and
    performing a collision resolution procedure in response to the determination that the UE is configured in the FACH state and is waiting for the L2 ACK message, wherein the collision resolution procedure establishes which one of a plurality of information elements (IEs) to choose for a reconfiguration procedure.

2. The method of claim 1, wherein performing the collision resolution procedure further comprises:
    establishing that the new cell is included in a reconfiguration message received from the network entity prior to triggering the reselection; and
    applying new cell IEs included in a cell update confirm message for the reconfiguration procedure to the new cell, wherein the cell update confirm message is received from the network entity in response to triggering a cell update message for the new cell.

3. The method of claim 2, further comprising performing the reconfiguration procedure for the new cell based on the new cell IEs, wherein the UE reselects to the new cell from the current cell in response to performing the reconfiguration procedure.

4. The method of claim 2, further comprising:
    transmitting an additional cell update message including the new cell IEs to the network entity for the new cell, wherein a reconfiguration status indicator (RSI) of the additional cell update message is set to FALSE.

5. The method of claim 1, wherein performing the collision resolution procedure further comprises:
    establishing that the new cell is not included in a reconfiguration message received from the network entity prior to triggering the reselection, wherein the reconfiguration message includes a third cell different from the new cell and the current cell; and
    applying third cell IEs included in the reconfiguration message for the reconfiguration procedure to the third cell.

6. The method of claim 5, further comprising performing the reconfiguration procedure for the new cell based on the third cell IEs, wherein the UE reselects to the new cell from the current cell in response to performing the reconfiguration procedure.

7. The method of claim 5, further comprising:
    transmitting an additional cell update message including the third cell IEs to the network entity for the third cell, wherein a reconfiguration status indicator (RSI) of the additional cell update message is set to FALSE.

8. The method of claim 1, wherein performing the collision resolution procedure further comprises:
    establishing that the new cell is not included in a reconfiguration message received from the network entity prior to triggering the reselection, wherein the reconfiguration message includes a third cell different from the new cell and a current cell;
    determining whether a cell quality of the new cell is greater than a cell quality of the third cell;
    applying new cell IEs included in a cell update confirm message for the reconfiguration procedure to the new cell when the cell quality of the new cell is greater than the cell quality of the third cell, wherein the cell update confirm message is received from the network entity in response to triggering a cell update message for the new cell;
    applying third cell IEs included in the reconfiguration message for the reconfiguration procedure to the third cell when the cell quality of the new cell is not greater than the cell quality of the third cell; and
    transmitting an additional cell update message including either the new cell IEs or the third cell IEs to the network entity based on the determination whether the cell quality of the new cell is greater than the cell quality of the third cell, wherein a reconfiguration status indicator (RSI) of the additional cell update message is set to FALSE.

9. The method of claim 8, further comprising performing the reconfiguration procedure for the new cell based on the new cell IEs, wherein the UE reselects to the new cell from the current cell in response to performing the reconfiguration procedure.

10. The method of claim 8, further comprising performing the reconfiguration procedure for the third cell based on the third cell IEs, wherein the UE redirects to the third cell from the current cell in response to performing the reconfiguration procedure.

11. The method of claim 1, wherein the plurality of IEs correspond to radio network temporary identifiers (RNTIs).

12. An apparatus for resolving conflicting configuration parameters during wireless communication, comprising:
    a memory configured to store data, and
    one or more processors communicatively coupled with the memory, wherein the one or more processors and the memory are configured to:
        trigger reselection to a new cell from a current cell;
        determine that a user equipment (UE) is configured in a forward access channel (FACH) state and is waiting for a Layer 2 Acknowledgement (L2 ACK) message from a network entity when reselection to the new cell is triggered; and
        perform a collision resolution procedure in response to the determination that the UE is configured in the FACH state and is waiting for the L2 ACK message, wherein the collision resolution procedure establishes which one of a plurality of information elements (IEs) to choose for a reconfiguration procedure.

13. The apparatus of claim 12, wherein the one or more processors and the memory configured to perform the collision resolution procedure are further configured to:
   establish that the new cell is included in a reconfiguration message received from the network entity prior to triggering the reselection; and
   apply new cell IEs included in a cell update confirm message for the reconfiguration procedure to the new cell, wherein the cell update confirm message is received from the network entity in response to triggering a cell update message for the new cell.

14. The apparatus of claim 13, wherein the one or more processor and the memory are configured to perform the reconfiguration procedure for the new cell based on the new cell IEs, wherein the UE reselects to the new cell from the current cell in response to performing the reconfiguration procedure.

15. The apparatus of claim 12, wherein the one or more processors and the memory configured to perform the collision resolution procedure are further configured to:
   establish that the new cell is not included in a reconfiguration message received from the network entity prior to triggering the reselection, wherein the reconfiguration message includes a third cell different from the new cell and the current cell; and
   apply third cell IEs included in the reconfiguration message for the reconfiguration procedure to the third cell.

16. The apparatus of claim 15, wherein the one or more processors and the memory configured to perform the reconfiguration procedure for the new cell based on the third cell IEs, wherein the UE reselects to the new cell from the current cell in response to performing the reconfiguration procedure.

17. The apparatus of claim 12, wherein the one or more processors and the memory configured to perform the collision resolution procedure are further configured to:
   establish that the new cell is not included in a reconfiguration message received from the network entity prior to triggering the reselection, wherein the reconfiguration message includes a third cell different from the new cell and a current cell;
   determine whether a cell quality of the new cell is greater than a cell quality of the third cell;
   apply new cell IEs included in a cell update confirm message for the reconfiguration procedure to the new cell when the cell quality of the new cell is greater than the cell quality of the third cell, wherein the cell update confirm message is received from the network entity in response to triggering a cell update message for the new cell;
   apply third cell IEs included in the reconfiguration, message for the reconfiguration procedure to the third cell when the cell quality of the new cell is not greater than the cell quality of the third cell; and
   transmit an additional cell update message including either the new cell IEs or the third cell IEs to the network entity based on the determination whether the cell quality of the new cell is greater than the cell quality of the third cell, wherein a reconfiguration status indicator (RSI) of the additional cell update message is set to FALSE.

18. The apparatus of claim 17, wherein the one or more processors and the memory configured to perform the reconfiguration procedure for the new cell based on the new cell IEs, wherein the UE reselects to the new cell from the current cell in response to performing the reconfiguration procedure.

19. The apparatus of claim 17, wherein the one or more processors and the memory configured to perform the reconfiguration procedure for the third cell based on the third cell IEs, wherein the UE redirects to the third cell from the current cell in response to performing the reconfiguration procedure.

20. A computer-readable medium storing computer executable code for resolving conflicting configuration parameters during wireless communication, comprising:
   code for triggering reselection to a new cell from a current cell;
   code for determining that a user equipment (UE) is configured in a forward access channel (FACH) state and is waiting for a Layer 2 Acknowledgement (L2 ACK) message from a network entity when reselection to the new cell is triggered; and
   code for performing a collision resolution procedure in response to the determination that the UE is configured in the FACH state and is waiting for the L2 ACK message, wherein the collision resolution procedure establishes which one of a plurality of information elements (IEs) to choose for a reconfiguration procedure.

* * * * *